(Model.)

D. S. HUMPHREY.
KNIFE FOR CUTTING SEED POTATOES.

No. 332,657. Patented Dec. 15, 1885.

Witnesses.
J. H. Burridge
N. S. Amstutz

Inventor.
D. S. Humphrey
W. H. Burridge Atty

_UNITED STATES PATENT OFFICE._

DUDLEY S. HUMPHREY, OF EAST TOWNSEND, OHIO.

KNIFE FOR CUTTING SEED-POTATOES.

SPECIFICATION forming part of Letters Patent No. 332,657, dated December 15, 1885.

Application filed March 23, 1885. Serial No. 159,835. (Model.)

*To all whom it may concern:*

Be it known that I, DUDLEY S. HUMPHREY, of East Townsend, in the county of Huron and State of Ohio, have invented a certain new and Improved Knife for Cutting Seed-Potatoes; and I do hereby declare that the following is a full and complete description of the same.

The knife above alluded to consists of a blade concavo-convex in cross-section, and tapering from the back to the cutting-edge, and curved longitudinally, and to which is secured a handle.

A more full and complete description of said knife will be given in the following specification, in connection with the accompanying drawings, in which—

Figure 1:
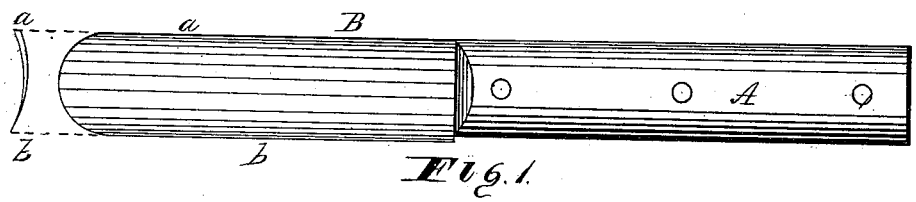
Figure 2:
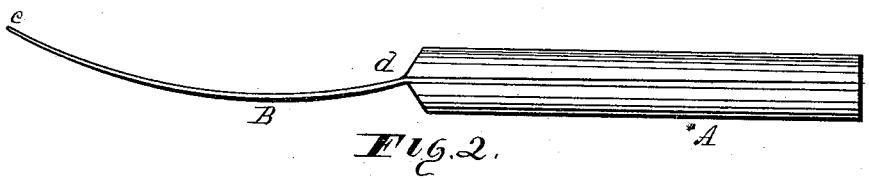
Figure 3:
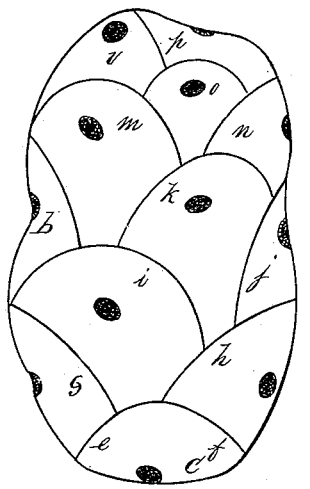

Figure 1 shows a face view, and Fig. 2 is an edge view of the knife. Fig. 3 is the representation of a potato, and Fig. 4 a section or part of one, both of which are lined to show the mode of cutting out the germ of the potato by the knife.

The purpose of the knife (the curve and concavity of which may be more or less) is to cut potatoes in pieces having one or more germs or eyes for seed by commencing at the stem end and cutting or scooping out in a curved manner one or more eyes from the potato until it is all cut up.

The advantages of this knife over a straight one heretofore generally used for this purpose are: The eyes or germs can be more easily cut out and faster, and therewith a larger portion of the flesh of the tuber necessary to the growth of the germ. The pieces are so cut by the knife that with the germ is cut a portion of the main or central stem connected to the eyes by side or branch stems, which cannot be done with a straight knife without injuring or destroying other germs of the tuber.

By the use of the knife herein described the pieces cut by it are more convenient to handle in planting them, as they are in better form than when cut in the old way.

In cutting with a straight knife the pieces are liable to be so thin and wide as to cause them to stick together when handled in planting, and when planted they are apt to dry up or decay, and therefore not germinate.

It is held that there is in a potato what may be called a "central stem" in the body of the tuber, to which the eyes are directly connected by minor stems in the same way that buds grow on the ends of twigs or trees. The theory is that by cutting out the eyes deep to the center, as hereinafter shown, they receive more nutriment by thus cutting the pieces to conform to this structure of the tuber, as the absorption and feeding takes place in this definite structure of vital tissue. This desired mode of cutting up the potato for seeding cannot be done with the old straight knife.

In the drawings, like letters of reference refer to like parts in the several views, in which A is the handle, and B the blade, secured to the handle by any suitable means. The blade in cross-section is concavo-convex, as shown at $a\ b$, Fig. 1, with the cutting-edge at $b$, and is curved longitudinally from $c$ to $d$, as indicated in Fig. 2. By this form and configuration of the blade the mechanical tendency of the knife is to cut in curve lines, or to scoop out, while a straight knife cuts in right lines.

Figure 4:
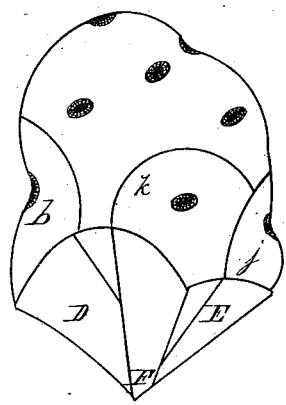

To illustrate the practical use of the improved knife, reference will be had to Figs. 3 and 4. Supposing Fig. 3 to be a potato, the cutting should be commenced at the stem end C, cutting out a piece indicated by the curved lines $e\ f$. The next cut may be either to the left or right of this, as noted by the curved lines $g$ and $h$, then the piece $i$, and next $j$, and so on until the tuber is cut into seed-pieces, as shown by the lines or sections. From the above it will be seen that the cutting is commenced at the stem end C, and the eyes are then cut out in regular order around the tuber. In Fig. 4 the form or shape of the cut represented at D shows that by means of the improved knife the pieces may be cut out each extending from the outside or face of the potato to its center, or what is called the "central stem" at F, Fig. 4, with which the germ is connected, as before stated.

It will be seen that the old straight knife is impracticable for this purpose of cutting out (economically and without injury) the eye or germ and its tissue continued with the central stem, but which is easily and readily done with the improved knife.

I am aware that knives are made (for seeding stone-fruit, &c.) with a longitudinally-curved blade, but without transverse curvature, and that knives are made having at the end curved bits, all of which, however, differ from my improved knife.

What I claim as my invention, and desire to secure by Letters Patent, is—

1. In a knife for cutting seed-potatoes, the blade thereof in cross-section concavo-convex, and curved longitudinally from the handle to the end of the blade, and tapering from the back to the cutting-edge, substantially as herein described, and for the purpose specified.

2. In a knife for cutting seed-potatoes, a blade concavo-convex in cross-section and provided with a handle, for the purpose specified, and substantially as set forth.

In testimony whereof I affix my signature in presence of two witnesses.

DUDLEY S. HUMPHREY.

Witnesses:
W. H. BURRIDGE,
J. H. BURRIDGE.